United States Patent Office 2,775,144
Patented Dec. 25, 1956

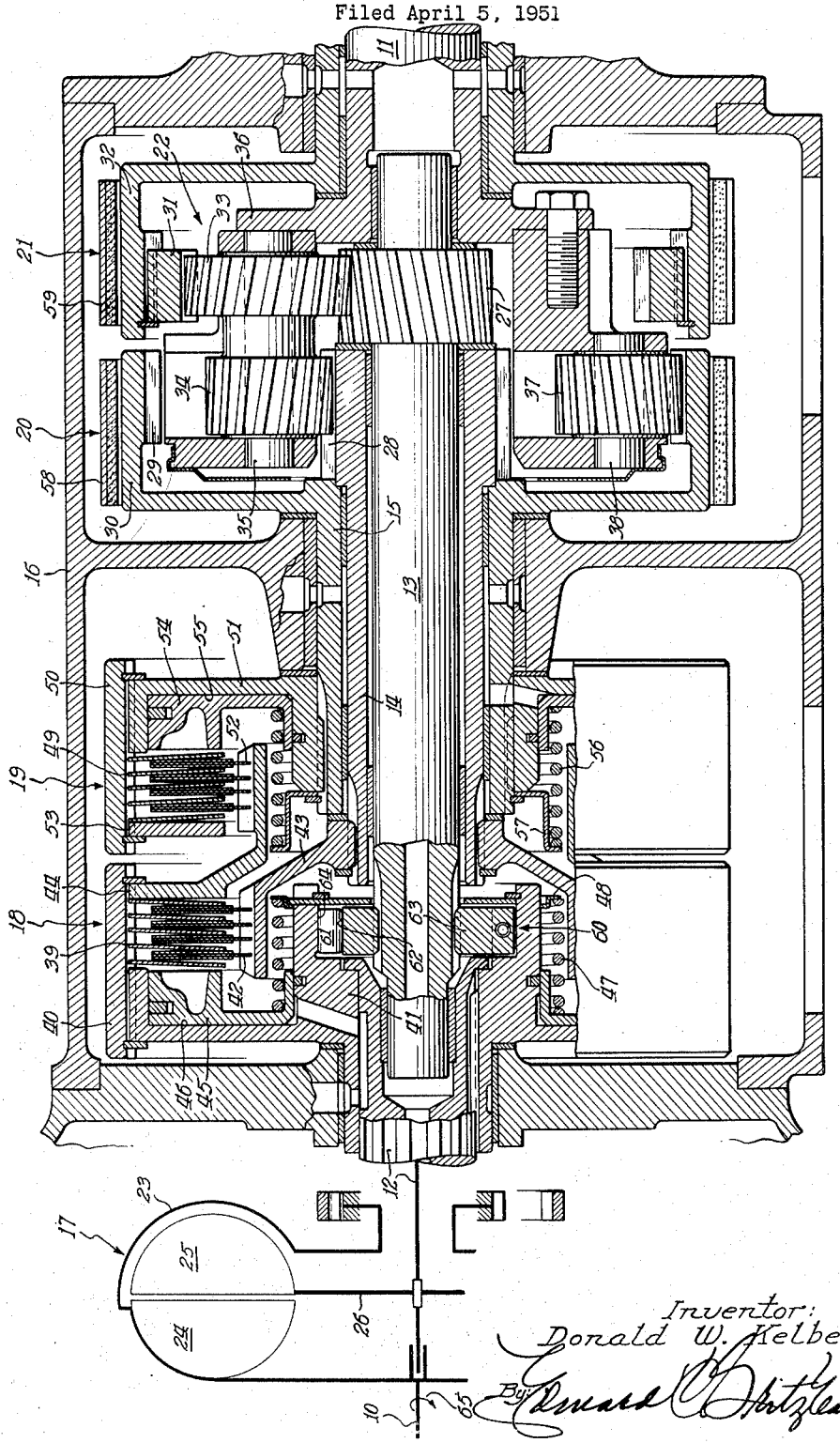

2,775,144

TRANSMISSION

Donald W. Kelbel, Muncie, Ind., assignor to Borg-Warner Corporation, Chicago, Ill., a corporation of Illinois Application April 5, 1951, Serial No. 219,434

8 Claims. (Cl. 74—769)

My invention relates to transmissions particularly adapted for use in automotive vehicles.

It is an object of the present invention to provide an improved transmission having four different speed ratio forward drives and particularly one that has three reduced speed forward drives and a direct drive. It is contemplated that the transmission shall preferably utilize only one gear set and that it shall preferably include a fluid coupling in each of the drives for cushioning purposes.

It is another object of the invention to provide a transmission of this type which includes a one-way clutch for completing the low speed drive whereby the next higher speed drive may be completed simply by engaging only one engageable device. It is also an object of the invention to provide friction engaging means for completing each of the drives whereby changes in drive through the transmission may be made without any interruption in torque application to the drive shaft of the transmission.

It is also an object of the invention to provide such a transmission which includes two friction brakes and two friction clutches in addition to the one-way clutch for completing the four forward drives and also the reverse drive through the transmission.

The invention consists of the novel constructions, arrangements and devices to be hereinafter described and claimed for carrying out the above stated objects and such other objects as will be apparent from the following description of a preferred embodiment of the invention illustrated with reference to the accompanying drawing which shows a longitudinal sectional view of a transmission embodying the principles of the invention.

Referring now to the drawing, the illustrated transmission comprises a drive shaft 10, a driven shaft 11, intermediate shafts 12 and 13 and intermediate sleeve shafts 14 and 15. All of these shafts are relatively rotatable and are coaxially disposed within a transmission casing 16. The drive shaft 10 is adapted to be driven by the crankshaft of the engine of the vehicle in which the transmission is installed, and the driven shaft 11 is adapted to drive road wheels of the vehicle through any suitable connections.

The transmission comprises, in general, a fluid coupling unit 17, friction clutches 18 and 19, friction brakes 20 and 21 and a planetary gear set 22.

The fluid coupling unit 17 comprises a fluid casing 23 connected with the drive shaft 10, a vaned impeller 24 disposed within the casing 23 and connected to rotate therewith and a vaned runner or driven element 25 connected to a hub 26 which is splined to the shaft 12.

The planetary gear set 22 comprises a sun gear 27 formed on the shaft 13, a second larger sun gear 28 formed on the shaft 14, a ring gear 29 formed within a drum portion 30 of the shaft 15, a ring gear 31 splined within a drum 32 rotatably disposed on the shaft 11, a plurality of planet gears 33 and a plurality of planet gears 34 connected together and rotatably disposed on shafts 35 carried by a planet gear carrier 36 which is formed on the driven shaft 11, and planet gears 37 rotatably disposed on shafts 38 carried by the carrier 36. Only one of each of the planet gears 33, 34 and 37 is illustrated, it being understood that others are disposed about the carrier 36. The planet gears 33 are in mesh both with the ring gear 31 and the sun gear 27. The planet gears 34 are in mesh with the sun gear 28, and each of the planet gears 37 is in mesh with one of the planet gears 34 and also with the ring gear 29.

The clutch 18 comprises a plurality of clutch discs 39 splined within a drum portion 40 which is connected to be driven by the shaft 12 by means of an annular shell 41 splined to the shaft 12 and drum portion 40. The clutch 18 also comprises clutch discs 42 splined on an annular hub 43 which in turn is splined to the sleeve shaft 14. An annular backing plate 44 is splined within the hub portion 40, and an annular hydraulically operated piston 45 is slidably disposed in a cavity 46 formed in the portion 41. The piston 45 is adapted to be moved by fluid pressure applied thereto to compress the discs 42 and 39 between the piston and the backing plate 44 for engaging the clutch, and a spring 47 is provided between the piston and a retainer ring 48 fixed with respect to the annular part 41 for returning the piston 45 to its illustrated position when fluid pressure is released from the piston 45.

The friction clutch 19 comprises clutch discs 49 splined within a cylindrical drum 50 which is fixed to rotate with the shaft 15 by means of an intermediate annular member 51 splined to both the drum 50 and the shaft 15. Clutch discs 52 interleaved with respect to the discs 49 are splined to the part 44, and a backing plate 53 is splined within the drum 50 at one end of the series of plates 49 and 52. An annular hydraulically operated piston 54 is disposed in a cavity 55 of the same shape provided in the member 51, and the piston is adapted to compress the interleaved plates 49 and 52 between it and the backing plate 53 for engaging the clutch. A spring 56 is provided between the piston 54 and a retainer ring 57 fixed on the shaft 15 for returning the piston 54 to its illustrated position when fluid pressure is relieved from the piston 54.

The brake 20 comprises a brake band 58 adapted to be contracted about and frictionally engage the drum portion 30, and the brake 21 comprises a similar band 59 adapted to engage the drum 32. The bands 58 and 59 may be applied on their respective drums by suitable fluid pressure actuated motors (not shown) or by any other suitable motors.

A one-way clutch 60 is provided between the shafts 12 and 13. The one-way clutch may be of any suitable construction and may comprise, for example, rollers 61 disposed between cam surfaces 62 provided on a hub 63 splined on the shaft 13 and an outer race surface 64 provided within the annular member 41. The one-way clutch 60 is so constructed as to engage to drive the shaft 13 from the shaft 12 in the forward direction, that is, in the same direction the shaft 10 is driven from the vehicle engine and which is indicated by the arrow 65.

The illustrated transmission provides, in forward drive, a low speed ratio, a second or relatively low intermediate speed ratio, a third or relatively high intermediate speed ratio and a fourth or high speed ratio, and the transmission also provides a reverse drive. Low forward speed ratio is provided by engaging the brake 21 which remains engaged for both of the intermediate speed drives. The drive in this case is from the drive shaft 10 through the fluid coupling housing 23 to the impeller 24, the runner 25, the shaft 12, the one-way clutch 60, the shaft 13, the sun gear 27, the planet gears 33, the planet gear carrier 36 to the driven shaft 11. The ring gear 31 in this instance functions as the reaction element of the planetary gear set 22 and is braked by the brake 21.

For second or the low intermediate speed drive, the friction clutch 18 is engaged by applying fluid under pressure to the piston 45, allowing the brake 21 to remain engaged, and the drive in this case is from the drive shaft 10 through the fluid coupling unit 17 to the shaft 12, the clutch 18, the annular hub member 43, the shaft 14, the sun gear 28, the planet gears 34 and 33, and the planet gear carrier 36 to the driven shaft 11. The ring gear 31 in this case, also, functions as the reaction element of the planetary gear set 22 but the sun gear 28 is driven in lieu of the sun gear 27. The drive from the shaft 12 to the sun gear 27 is broken by the one-way clutch 60 which overruns.

The third speed ratio drive is obtained by disengaging the clutch 18 and engaging the clutch 19, allowing the brake 21 to remain engaged. The drive in this case is from the drive shaft 10 through the fluid coupling unit 17 to the shaft 12, the members 41, 40 and 44, the clutch 19, the member 51, the shaft 15, the ring gear 29, the planet gears 37, 34 and 33, and the planet gear carrier 36 to the driven shaft 11. The ring gear 31 in this case, also, functions as the reaction element of the planetary gear set, being held stationary by the brake 21, and the ring gear 29 functions as the input element of the planetary gear set.

The high speed drive is obtained by engaging both of the clutches 18 and 19 and disengaging the brake 21. The drive in this case is from the shaft 10 through the fluid coupling unit 17, the shaft 12, the clutch 18, the annular hub member 43, and shaft 14 to the sun gear 28 of the planet gear unit 22. A drive proceeds also from the shaft 12 through the parts 41, 40 and 44, the clutch 19, the parts 50, 51, and shaft 15 to the ring gear 29, so that this gear also is driven directly from the shaft 12. Since both the sun gear 28 and ring gear 29 are driven directly from the shaft 12, all of the elements of the planetary gear set 22 are locked to rotate as a unit in accordance with well-known principles of operation of planetary gear units, and the carrier 36 and shaft 11 are thereby driven at a one to one drive with respect to the shaft 12.

Reverse drive is obtained by engaging the brake 20. The drive in this case is from the drive shaft 10 through the fluid coupling unit 17, the shaft 12, the one-way clutch 60, the shaft 13, the sun gear 27, the planet gears 33, 34 and 37, and the planet gear carrier 36 to the driven shaft 11.

The illustrated transmission advantageously provides four forward drives including three reduced speed drives of different speed ratio and a direct drive. The transmission also provides a drive in reverse. All of these drives include the fluid coupling unit 17 which takes the full torque of the drive shaft 10 and provides a cushioned drive, particularly when the driven shaft 11 of the transmission is being started. The low speed forward drive advantageously includes the one-way clutch 60, so that the next higher speed may be obtained simply by engaging the clutch 18 without a simultaneous disengagement of any controlled brake or clutch whereby this change in drive is quite smooth.

I wish it to be understood that my invention is not to be limited to the specific constructions and arrangements shown and described, except only insofar as the claims may be so limited, as it will be understood to those skilled in the art that changes may be made without departing from the principles of the invention.

I claim:

1. In transmission mechanism, the combination of a drive shaft, a driven shaft, means including planetary gearing constructed and arranged to transmit torque therethrough comprising a pair of relatively rotatable sun gears and a pair of ring gears rotatable relative to said sun gears and planet gear means adapted to intermesh between said sun and ring gears for providing a plurality of forward drive power trains including a relatively low speed forward drive power train and a relatively high speed forward drive power train and also a reverse drive power train between said shafts, said low speed forward drive power train including a one-way engaging device adapted for coupling one of said sun gears to said drive shaft and also including a friction engaging device operative to hold one of said ring gears against rotation for completing the train, said reverse drive power train including said one-way engaging device coupling said one sun gear to said drive shaft and also including a second friction engaging device operative to hold the other of said ring gears against rotation for completing the train, said high speed forward drive power train including an additional friction engaging device adapted to couple the other of said sun gears to said drive shaft for completing the power train and said one-way engaging device overrunning and disengaging when said relatively high speed forward drive power train is completed.

2. In transmission mechanism, the combination of a drive shaft, a driven shaft, means for providing a plurality of forward drives between said shafts and including a double planetary gear set having a ring gear and two sun gears, said gear set including two planet gears with one of the planet gears in mesh with the ring gear and the other of the planet gears in mesh with the first planet gear and one of the sun gears, a brake for an element of said gear set for taking the reaction in the gear set for said forward drives, a pair of clutches for connecting said ring gear or one of said sun gears with one of said shafts for respectively completing one or the other of said forward drives when one or the other of said clutches is engaged, and means for completing another of said forward drives between said shafts and including a clutch for connecting the other of said sun gears with one of said shafts to complete the drive when it and said brake are engaged.

3. In transmission mechanism, the combination of a drive shaft, a driven shaft, means for providing three forward drive reduced speed power trains of different ratio between said shafts and a direct drive power train and including a double planetary gear set, said gear set including a ring gear and two sun gears and also including two planet gears with one of the planet gears in mesh with the ring gear and the other of the planet gears in mesh with the first planet gear and one of the sun gears, a friction brake for an element of said gear set for taking the reaction for all of said reduced speed power trains, three clutches for connecting said ring gear or either of said sun gears with said drive shaft for respectively completing the three reduced speed power trains when said brake is engaged, two of said clutches being of the friction type and when both are engaged completing the direct drive power train between said shafts.

4. In transmission mechanism, the combination of a drive shaft, a driven shaft, a planetary gear set comprising a sun gear, a ring gear, a planet gear in mesh with the sun gear, a planet gear in mesh with said ring gear and said first planet gear, a second sun gear, a planet gear in mesh with said second sun gear and connected with said first planet gear and a carrier for said planet gears, a reaction element in said gear set, clutch means for connecting said first named sun gear with one of said shafts and means for connecting said carrier with the other of said shafts, a brake for said reaction element for completing a change speed ratio between said shafts when said clutch means are engaged, and a clutch for connecting said ring gear to one of said shafts for completing another change speed ratio between said shafts when said brake is engaged.

5. In transmission mechanism, the combination of a drive shaft, a driven shaft, a planetary gear set comprising a sun gear, a ring gear, a planet gear in mesh with said sun gear, a planet gear in mesh with said ring gear and with first named planet gear, a carrier for said planet gears, means for connecting said carrier with one of said shafts, a pair of clutches for alternately connecting either said sun gear on said ring gear with said other shaft, a planet gear connected with said first named planet gear, a ring gear in mesh with said third named planet gear, and a brake for said last named ring gear for completing a change speed drive between said shafts when it and one of said clutches are engaged and for completing another change speed drive when it and the other of said clutches is engaged.

6. In transmission mechanism, the combination of a drive shaft, a driven shaft, means for completing a reverse drive power train and a plurality of forward drive power trains between said shafts and including a planetary gear set, said gear set comprising a sun gear, a ring gear, a planet gear in mesh with said sun and ring gears, a second planet gear connected with said first named planet gear, a third planet gear in mesh with said second planet gear, a ring gear in mesh with said third planet gear, and a carrier for said planet gears connected with one of said shafts, clutch means for connecting said sun gear with said other shaft, a brake for said first named ring gear for completing one of said forward drive power trains between said shafts when it and said clutch means are engaged, a brake for said second named ring gear for completing said reverse drive when engaged, and clutch means for connecting one of said ring gears to said other shaft to complete another one of said forward drive power trains between said shafts when the brake associated with the other ring gear is engaged and the remaining brake is disengaged.

7. In transmission mechanism, the combination of a drive shaft, a driven shaft, means for providing four forward drive power trains of different speed ratio including three reduced speed power trains and a direct drive between said shafts and including a planetary gear set, said gear set comprising a sun gear, a ring gear, a planet gear in mesh with said sun and ring gears, a second sun gear, a second planet gear connected with said first named planet gear and in mesh with said second sun gear, a third planet gear in mesh with said second planet gear and a second ring gear in mesh with said third planet gear, a one-way clutch for connecting said first named sun gear with said drive shaft for providing a low speed ratio forward drive, a friction clutch for connecting said second sun gear with said drive shaft for providing an intermediate speed drive between the shafts, a friction clutch for connecting said second ring gear with said drive shaft for providing a higher intermediate speed drive, a brake for said first named ring gear for completing said three reduced speed power trains, said direct drive being completed when both of said friction clutches are engaged, and means for completing a reverse drive between said shafts and including a friction brake for said second named ring gear for completing the reverse drive when engaged.

8. In transmission mechanism, the combination of a drive shaft, a driven shaft, means including planetary gearing constructed and arranged to transmit torque therethrough comprising a pair of relatively rotatable sun gears and a pair of ring gears rotatable relative to said sun gears and also including a planet gear carrier connected to said drive shaft and a plurality of planet gears constructed and arranged to intermesh between one of said sun gears and one of said ring gears and between the other of said sun gears and the other of said ring gears including a plurality of pairs of planet gears coupled together and rotatably disposed on common portions of said planet gear carrier adapted to transmit power between said sun and ring gears with one gear of each pair in engagement with one of said sun gears and the other gear of each pair in engagement with the other of said sun gears constructed and arranged to provide a plurality of forward drive power train including a relative low speed forward drive power train and a relatively high speed forward drive power train and also a reverse drive power train between said shafts, said low speed forward drive power train including a one-way engaging device operative to connect one of said sun gears to said drive shaft and also including a friction engaging device operative to hold one of said ring gears against rotation for completing the train, said reverse drive power train including said one-way engaging device coupling said one sun gear to said drive shaft and also including a second friction engaging device operative to hold the other of said ring gears against rotation for completing the train, said high speed forward drive power train including an additional friction engaging device adapted to couple the other of said sun gears to said drive shaft for completing the power train and said one-way engaging device overrunning and disengaging when said relatively high speed forward drive power train is completed.

References Cited in the file of this patent
UNITED STATES PATENTS

| | | |
|---|---|---|
| 694,197 | Rose | Feb. 25, 1902 |
| 710,500 | McElroy | Oct. 7, 1902 |
| 908,419 | Northway | Dec. 29, 1908 |
| 1,256,371 | Rowledge | Feb. 12, 1918 |
| 1,500,588 | La Voie | July 8, 1924 |
| 2,259,730 | Burtnett | Oct. 21, 1941 |
| 2,324,713 | McFarland | July 20, 1943 |
| 2,339,626 | Duffield | Jan. 18, 1944 |
| 2,354,257 | Greenlee | July 25, 1944 |
| 2,372,817 | Dodge | Apr. 3, 1945 |
| 2,395,459 | Carnagua | Feb. 26, 1946 |
| 2,403,378 | Kilpela | July 2, 1946 |
| 2,466,320 | Lawrence | Apr. 5, 1947 |
| 2,514,963 | McRae | July 11, 1950 |
| 2,528,584 | Farkas | Nov. 7, 1950 |
| 2,605,652 | Kelbel | Aug. 5, 1952 |

FOREIGN PATENTS

| | | |
|---|---|---|
| 154,694 | Great Britain | Nov. 30, 1920 |